United States Patent
Evangelista et al.

(10) Patent No.: US 9,289,855 B2
(45) Date of Patent: Mar. 22, 2016

(54) SHEET METAL PIECE HAVING WELD NOTCH AND METHOD OF FORMING THE SAME

(71) Applicant: Shiloh Industries, Inc., Valley City, OH (US)

(72) Inventors: James J. Evangelista, Northville, MI (US); Michael Telenko, Jr., Canton, MI (US); Jason E. Harfoot, Walled Lake, MI (US); Jack A. Atkinson, Brunswick, OH (US); James W. Walther, Litchfield, OH (US); Anthony M. Parente, Valley City, OH (US)

(73) Assignee: Shiloh Industries, Inc., Valley City, OH (US)

( * ) Notice: Subject to any disclaimer, the term of this patent is extended or adjusted under 35 U.S.C. 154(b) by 294 days.

(21) Appl. No.: 13/903,163

(22) Filed: May 28, 2013

(65) Prior Publication Data

US 2013/0316185 A1    Nov. 28, 2013

Related U.S. Application Data

(60) Provisional application No. 61/651,645, filed on May 25, 2012, provisional application No. 61/666,388, filed on Jun. 29, 2012, provisional application No. 61/701,909, filed on Sep. 17, 2012, provisional application No. 61/731,497, filed on Nov. 30, 2012, provisional application No. 61/784,184, filed on Mar. 14, 2013.

(51) Int. Cl.
*B32B 15/01* (2006.01)
*B23K 26/36* (2014.01)
(Continued)

(52) U.S. Cl.
CPC .............. *B23K 26/365* (2013.01); *B23K 26/36* (2013.01); *B23K 26/40* (2013.01); *B32B 3/02* (2013.01);
(Continued)

(58) Field of Classification Search
USPC .......... 219/101–107; 428/653, 658, 667, 676, 428/679, 681
See application file for complete search history.

(56) References Cited

U.S. PATENT DOCUMENTS 2,177,868 A   10/1939   Chapman
3,733,681 A    5/1973   Schlein
(Continued)

FOREIGN PATENT DOCUMENTS

CN   ON1633333 A    6/2005
CN   101204866 A    6/2008
(Continued)

OTHER PUBLICATIONS

Miller, Duane, "Use Double Side Groove Welds", Modern Steel Construction, Issue No. 5, Feb. 1998.*
(Continued)

*Primary Examiner* — Humera Sheikh
*Assistant Examiner* — Lucas Wang
(74) *Attorney, Agent, or Firm* — Reising Ethington, P.C.

(57) ABSTRACT

A sheet metal piece includes a base material layer and one or more intermediate and coating material layers, along with a weld notch formed along an edge region of the piece. At least a portion of the coating and intermediate material layers is removed at the weld notch so that certain constituents from such layers do not affect the integrity of a nearby weld joint when it is subsequently formed along the edge region. Various methods of ablation, including laser ablation, can be used to form the weld notch.

9 Claims, 11 Drawing Sheets

(51) Int. Cl.
  *B32B 3/02* (2006.01)
  *C22C 21/02* (2006.01)
  *C22C 38/06* (2006.01)
  *B23K 26/40* (2014.01)
  *B23K 3/02* (2006.01)

(52) U.S. Cl.
  CPC ............... *B32B 15/01* (2013.01); *B32B 15/012* (2013.01); *C22C 21/02* (2013.01); *C22C 38/06* (2013.01); *B23K 2203/16* (2013.01); *Y10T 428/12396* (2015.01)

(56) References Cited

U.S. PATENT DOCUMENTS

| | | | |
|---|---|---|---|
| 4,037,073 A | 7/1977 | Becker | |
| 4,073,427 A | 2/1978 | Keifert et al. | |
| 4,401,727 A | 8/1983 | Berke et al. | |
| 4,459,062 A | 7/1984 | Siebert | |
| 4,474,861 A | 10/1984 | Ecer | |
| 4,688,691 A | 8/1987 | Christian | |
| 4,725,507 A | 2/1988 | Lescaut | |
| 4,758,703 A | 7/1988 | Drever et al. | |
| 4,818,629 A | 4/1989 | Jenstrom et al. | |
| 5,305,946 A | 4/1994 | Heilmann | |
| 5,952,109 A | 9/1999 | Nagami et al. | |
| 6,042,659 A | 3/2000 | Brown et al. | |
| 6,296,805 B1 | 10/2001 | Laurent et al. | |
| 6,407,363 B2 | 6/2002 | Dunsky et al. | |
| 6,564,604 B2 | 5/2003 | Kefferstein et al. | |
| 6,621,040 B1 | 9/2003 | Perry et al. | |
| 6,674,472 B1 | 1/2004 | Tsutsui | |
| 6,800,150 B2 | 10/2004 | Totino | |
| 7,531,283 B2 | 5/2009 | Darcy, III et al. | |
| 7,748,598 B2 | 7/2010 | Want | |
| 7,971,303 B2 | 7/2011 | Prasad et al. | |
| 8,614,008 B2 | 12/2013 | Canourgues | |
| 8,642,134 B2 | 2/2014 | Nagai | |
| 2001/0016268 A1 | 8/2001 | Maki et al. | |
| 2001/0042393 A1 | 11/2001 | Kefferstein et al. | |
| 2001/0054638 A1 | 12/2001 | Hardwick | |
| 2002/0148880 A1 | 10/2002 | Brink | |
| 2003/0201037 A1 | 10/2003 | Totino et al. | |
| 2004/0247932 A1 | 12/2004 | Kagohara et al. | |
| 2005/0136184 A1 | 6/2005 | Voges | |
| 2005/0211687 A1 | 9/2005 | Sonoda et al. | |
| 2007/0034614 A1 | 2/2007 | McClain et al. | |
| 2008/0092312 A1 | 4/2008 | Prasad et al. | |
| 2008/0145688 A1 | 6/2008 | Miller et al. | |
| 2008/0257871 A1 | 10/2008 | Leiser | |
| 2008/0268279 A1* | 10/2008 | Want | 428/615 |
| 2009/0220815 A1* | 9/2009 | Canourgues et al. | 428/583 |
| 2009/0253809 A1 | 10/2009 | Gomurashvili et al. | |
| 2010/0139691 A1 | 6/2010 | Silberberg et al. | |
| 2010/0139864 A1 | 6/2010 | Silberberg et al. | |
| 2012/0074106 A1 | 3/2012 | Canourgues | |
| 2012/0205355 A1 | 8/2012 | Munzer et al. | |
| 2013/0236239 A1 | 9/2013 | Brandt et al. | |
| 2014/0057128 A1 | 2/2014 | Canourgues | |

FOREIGN PATENT DOCUMENTS

| | | | | |
|---|---|---|---|---|
| CN | 101426612 A | 5/2009 | | |
| DE | 2122926 A1 | 11/1972 | | |
| DE | 102010019258 | 11/2011 | | |
| EP | 1143029 | 10/2001 | | |
| EP | 1878531 | 1/2008 | | |
| FR | 2827874 | 1/2003 | | |
| JP | S61-159292 | * | 1/1985 | ............ B23K 26/00 |
| JP | S61159292 A | 7/1986 | | |
| JP | 07096380 | 4/1995 | | |
| JP | H07-096380 | * | 4/1995 | ............ B23K 26/00 |
| JP | H07293749 A | 11/1995 | | |
| JP | 9314337 A | 12/1997 | | |
| JP | H10168545 A | 6/1998 | | |
| JP | H10176287 A | 6/1998 | | |
| JP | H11239872 A | 9/1999 | | |
| JP | 2002256407 A | 9/2002 | | |
| JP | 2003183802 A | 7/2003 | | |
| JP | 2004223543 A | 8/2004 | | |
| JP | 2010052161 A | 3/2010 | | |
| KR | 1019980056004 A | 9/1998 | | |
| KR | 2004-0058615 A | 7/2004 | | |
| WO | WO2009/092760 | * | 7/2009 | ............ B23K 26/36 |
| WO | WO2009092760 A1 | 7/2009 | | |
| WO | WO2011020490 A1 | 2/2011 | | |

OTHER PUBLICATIONS

Jenny et al., ed., Welding Handbook, 9th Ed., vol. 1, American Welding Society, Section 5.5, pp. 184-191.*

Vierstraete et al., "Laser Ablation for Hardening Laser Welded Steel Blanks", Industrial Laser Solutions, Mar. 2010, pp. 6-11.*

Written Opinion & International Search Report for PCT/US13/042882, Aug. 27, 2013, 13 pages.

Reinhold Braun, Nd:YAG Laser Butt Welding of AA6013 Using Silicon and Magnesium Containing Filler Powders, A 426, Materials Science and Engineering, Jun. 25, 2006.

Vierstraete; Ehling; Pic; Yin, Laser Ablation for Hardening Laser Welded Steel Blanks, Industrial Laser Solutions, Mar. 2010, pp. 6-11.

* cited by examiner

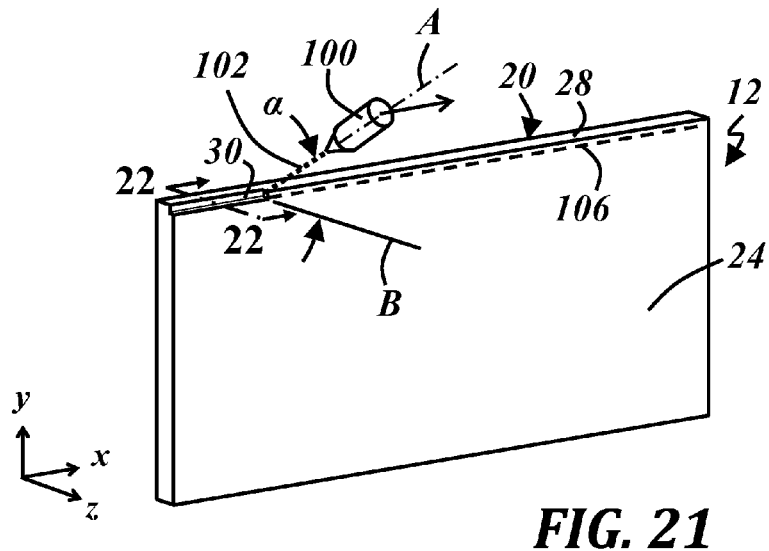
FIG. 21
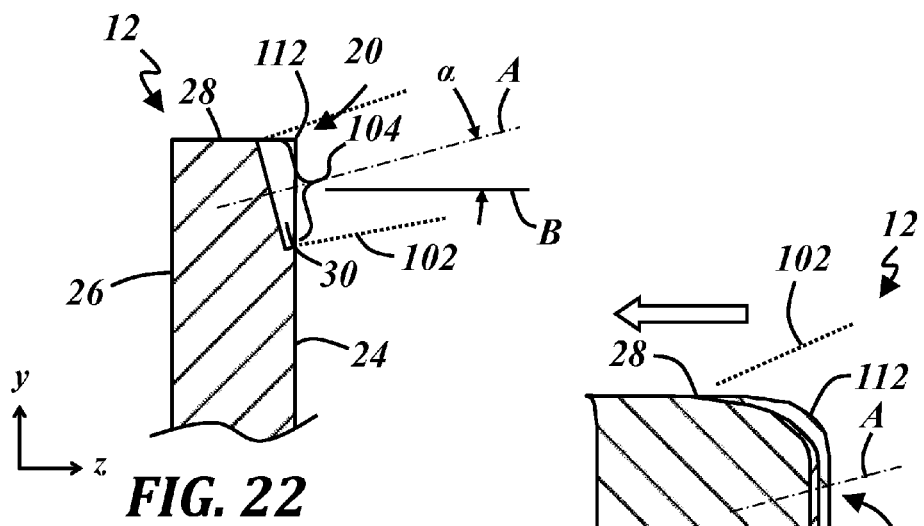
FIG. 22
FIG. 23

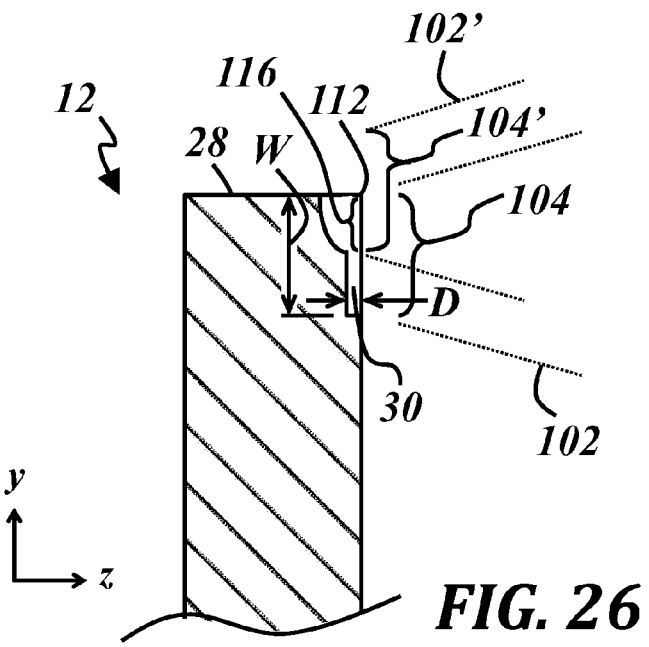
FIG. 26
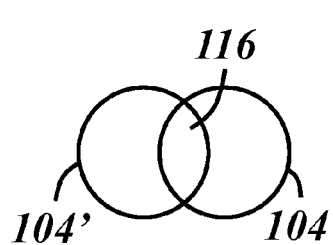
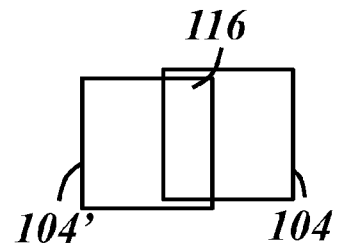
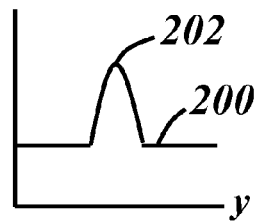
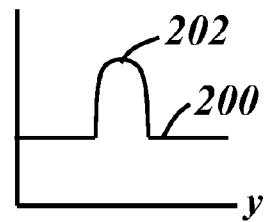
FIG. 27  FIG. 28

SHEET METAL PIECE HAVING WELD NOTCH AND METHOD OF FORMING THE SAME

REFERENCE TO RELATED APPLICATIONS

This application claims the benefit of U.S. Provisional Ser. Nos. 61/651,645 filed on May 25, 2012; 61/666,388 filed on Jun. 29, 2012; 61/701,909 filed on Sep. 17, 2012; 61/731,497 filed on Nov. 30, 2012; and 61/784,184 filed on Mar. 14, 2013, the entire contents of which are incorporated herein by reference.

TECHNICAL FIELD

The present disclosure generally relates to sheet metal pieces and, more particularly, to sheet metal pieces that are coated with one or more thin material layers and are used in welding processes.

BACKGROUND

In an effort to improve resistance to corrosion, scaling and/or other processes, sheet metal made of high-strength or hardenable steel alloys are now being made with one or more thin coating material layers, such as aluminum- and zinc-based layers. Although these coating material layers can impart desirable qualities to the sheet metal, their presence can contaminate welds, thereby reducing weld strength, integrity, etc. This is particularly true if the coated sheet metal piece is being butt welded or lap welded to another sheet metal piece.

SUMMARY

In accordance with one or more embodiments, a sheet metal piece for use in a welding process includes a base material layer, a coating material layer, and an intermediate material layer. The intermediate material layer is located between the base material layer and the coating material layer and includes an intermetallic compound having at least one constituent from each of the base material layer and the coating material layer. The sheet metal piece includes an edge region located along an edge of the sheet metal piece that is to be welded. The edge region includes a weld notch defined at least partially by a weld notch surface that includes material from both the coating material layer and the intermediate material layer.

In accordance with one or more other embodiments, a method of forming a weld notch in a sheet metal piece comprises the steps of: (a) providing a sheet metal piece having a plurality of material layers at an edge region; (b) directing a laser beam towards the edge region of the sheet metal piece; and (c) removing material from at least one of the plurality of material layers at the edge region of the sheet metal piece with the laser beam so that a weld notch is formed where the removed material is no longer present.

DRAWINGS

Preferred exemplary embodiments will hereinafter be described in conjunction with the appended drawings, wherein like designations denote like elements, and wherein:

FIGS. 1A-C are cross-sectional views of a conventional weld joint joining sheet metal pieces that did not have weld notches formed therein before welding;

FIG. 21 is a perspective view of another exemplary laser ablation process, where the process forms a weld notch using a laser with a non-zero angle of incidence;

FIG. 22 is a cross-sectional view of the laser ablation process from FIG. 21, where the process forms an offset weld notch on a single side of the sheet metal piece;

FIG. 23 is an enlarged cross-sectional view of an edge region of the sheet metal piece from FIG. 21 prior to formation of the offset weld notch;

FIG. 26 is another cross-sectional view of the laser ablation process from FIG. 24, where the process forms a weld notch with multiple overlapping lasers;

FIG. 27 illustrates overlapping laser spots or footprints that may be used with the laser ablation process of FIG. 26 and a corresponding energy distribution;

Figure 29:
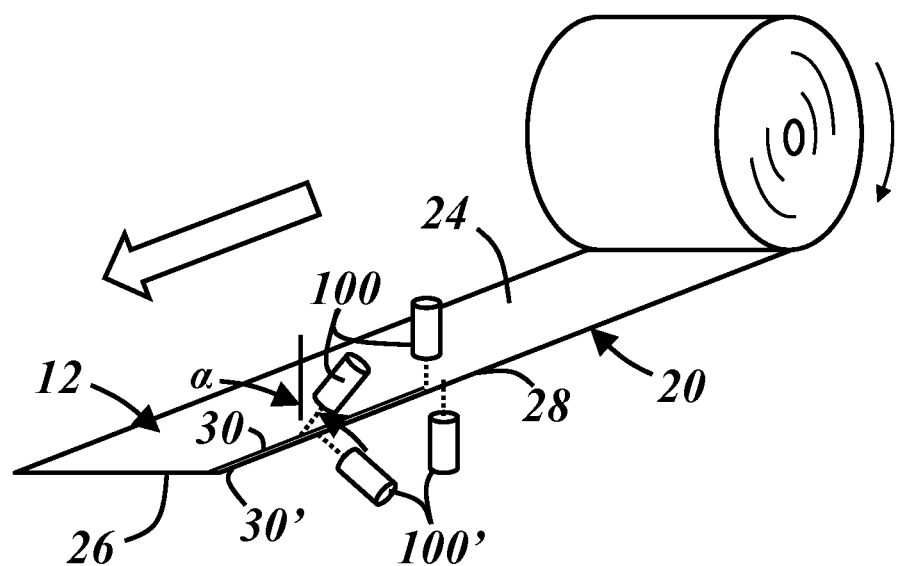

FIG. 28 illustrates overlapping laser spots or footprints that may be used with the laser ablation process of FIG. 26 and another corresponding energy distribution; and FIG. 29 is a perspective view of another exemplary laser ablation process being performed on a sheet metal piece coming off of a metal coil, where the process uses multiple lasers to form weld notches on opposite sides of the sheet metal piece.

DETAILED DESCRIPTION

The sheet metal pieces disclosed herein can be made with weld notches located along one or more edges, where the weld notches are characterized by the absence of certain material constituents so that they do not unacceptably contaminate nearby welds. For instance, a sheet metal piece can be produced so that material from one or more coating material layers is reduced or removed at a weld notch located along the sheet metal edge. This, in turn, can prevent contamination by the coating material layers of a nearby weld joint formed along the sheet metal edge and thereby preserve the strength and/or durability of the weld joint in subsequent processes or during its service life.

Figure 1A:
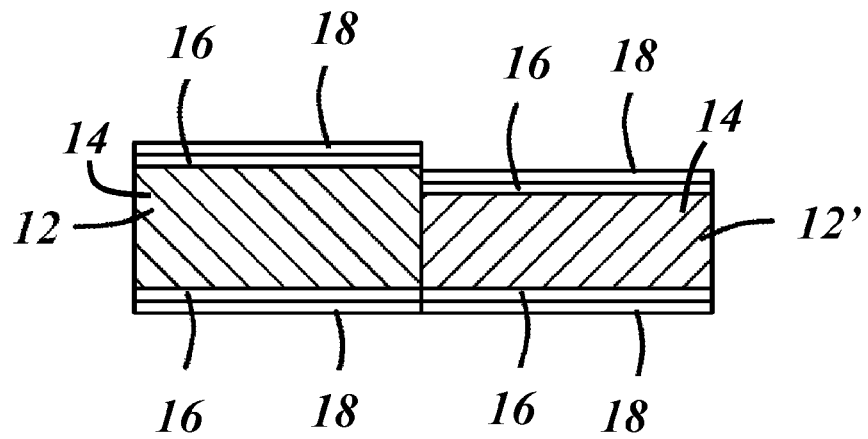
Figure 1B:
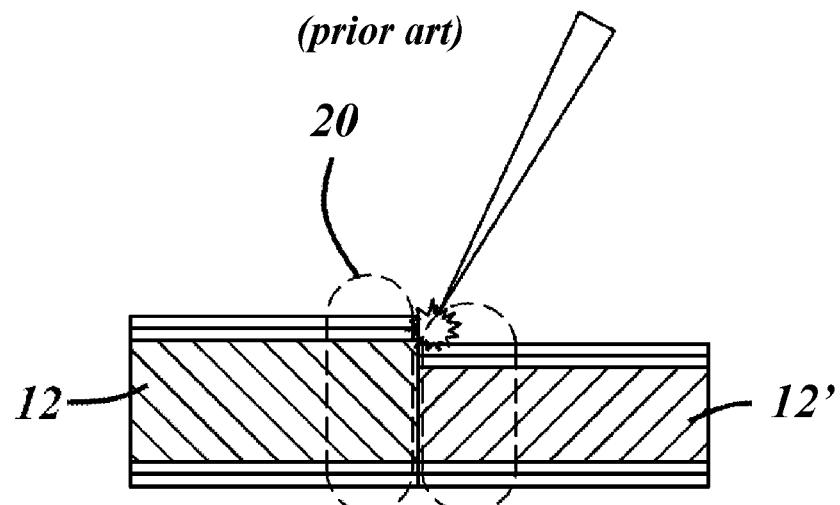
Figure 1C:
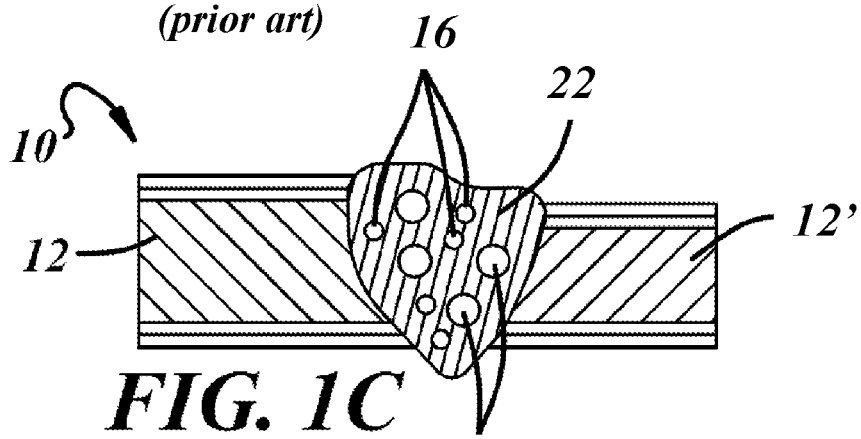

Turning first to FIGS. 1A-C, there are shown some of the steps involved with manufacturing a conventional tailor-welded blank 10 that includes thick and thin sheet metal pieces 12, 12' laser welded together in an edge-to-edge fashion. According to this example, each of the sheet metal pieces 12, 12' has a base material layer 14 and multiple thin material layers 16, 18 covering opposite surfaces of the base material layer. As is appreciated by those skilled in the art, there are numerous material layers that could be found on sheet metal stock, including various types of surface treatments, coating material layers such as aluminum- and zinc-based material layers, oils and other oxidation preventing substances, contaminants from the manufacturing or material handling processes, and oxidation layers, to name but a few. Once the two sheet metal pieces are brought together in abutment, a laser beam or other welding tool is used to melt some of the sheet metal located in edge regions 20, 20' so that a certain amount of the thin material layers 16, 18 becomes embedded within the resulting weld joint 22. Unless first removed, these unwanted constituents could have a negative impact on the overall strength and quality of the weld joint.

Figure 2:
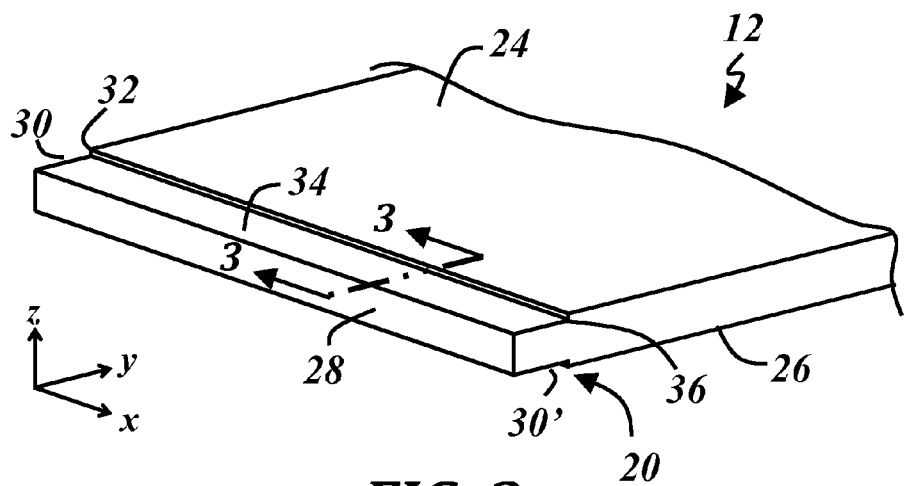
FIG. 2 is a perspective view of an edge region of an exemplary sheet metal piece, including weld notches on opposite sides of the sheet metal piece.

Referring to FIG. 2, there is shown an exemplary sheet metal piece 12 that may be welded to an adjacent piece along edge region 20. The sheet metal piece 12 includes opposite first and second sides 24, 26, and the edge region 20 is located along an edge 28 of the sheet metal piece that is to be welded. The particular edge region 20 shown in FIG. 2 includes two weld notches 30, 30', where the two weld notches extend along the edge region on opposite sides 24, 26 of the sheet metal piece 12. Each weld notch 30, 30' is defined by a first notch surface 32 and a second notch surface 34 that intersect or join each other. Though shown with generally perpendicular first and second notch surfaces 32, 34 along a single, straight edge region 20, the weld notches may be configured in numerous ways. For example, a weld notch can include one or more off-axis notch surface(s), have different dimensions than another weld notch of the same sheet metal piece, be formed as part of a different edge region than another weld notch, and/or be formed as part of an edge region located along a contoured edge of the sheet metal piece, to cite several possibilities. Some of these different embodiments are illustrated in the drawings.

Figure 3:
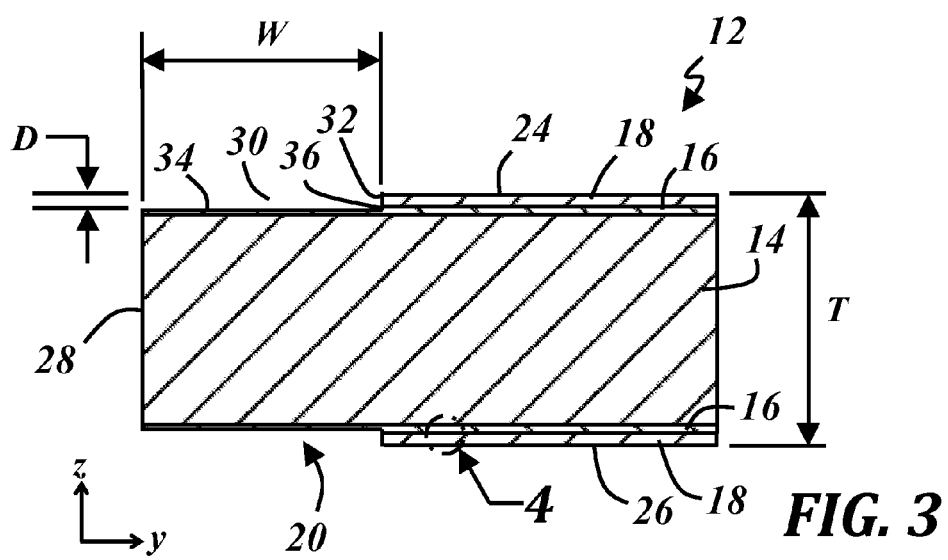
FIG. 3 is a cross-sectional view of a portion of the sheet metal piece of FIG. 2, showing coating layers, intermediate material layers, and weld notches on opposite sides of the sheet metal piece.

FIG. 3 is a cross-section of the edge region 20 of the sheet metal piece 12 of FIG. 2. The illustrated sheet metal piece 12 includes multiple material layers, including the base material layer 14, intermediate material layers 16, and coating material layers 18. In this embodiment, the base material layer 14 is the central or core material layer (e.g., a steel core) and is sandwiched between the intermediate material layers 16 and the coating material layers 18. The base material layer 14 makes up the majority of the thickness T of the sheet metal piece 12 and thus may contribute significantly to the mechanical properties of the sheet metal piece. The coating material layers 18 are located over opposite surfaces of the base material layer 14 and are the outermost layers of the sheet metal piece 12. Each coating material layer 18 is relatively thin with respect to the base material layer 14 and may be selected to enhance one or more characteristics of the sheet metal piece (e.g., corrosion resistance, hardness, weight, formability, appearance, etc.). The coating material layer 18 may also be selected for use or compatibility with subsequent processes, such as heat treatment or interdiffusion processes, for example.

Each intermediate layer 16 is located between the base material layer 14 and one of the coating material layers 18, and is in contact with each in this embodiment. In one embodiment, the intermediate material layer 16 includes at least one constituent in common with each of the immediately adjacent layers 14, 18, such as an atomic element or chemical compound. The intermediate material layer 16 may be a reaction product of the base and coating material layers 14, 18. For example, a dip coating process, in which the base material layer is immersed or passes through a molten bath of coating layer material, can result in a chemical reaction at the interface of the base material layer and the molten bath, and the reaction product is the intermediate material layer 16. In one specific example of such a dip coating process, the base material layer 14 is made of a high-strength or hardenable steel alloy and the coating material layer 18 is an aluminum alloy. The molten bath of aluminum alloy reacts with the base material layer at its surface to form the intermediate material layer 16, which includes iron-aluminum ($Fe_xAl_y$) intermetallic compounds such as $Fe_2Al_5$. The intermediate layer can have a higher content of the base material layer constituent (e.g., iron) closer the base material layer 14 and a higher content of the coating material layer constituent (e.g., aluminum) closer to the coating material layer 18.

Figure 4:
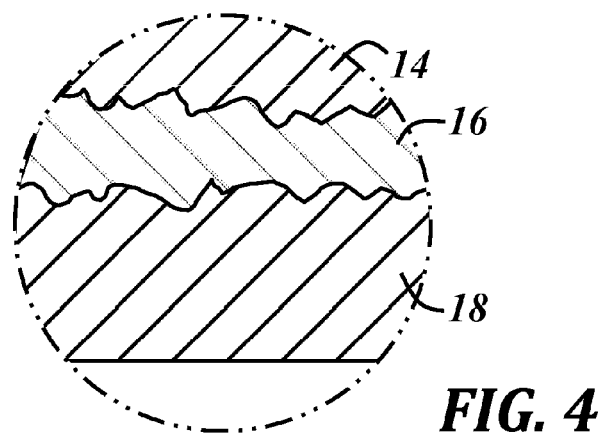
FIG. 4 is an enlarged view of a portion of FIG. 3, showing irregular surfaces between material layers.

Though shown in FIG. 3 as a perfectly planar layer with a constant thickness, the intermediate material layer 16 may be irregular along its opposite surfaces as depicted in the enlarged view of FIG. 4. It should also be understood that the intermediate material layer 16 is not necessarily uniform in composition throughout, nor is it necessarily a reaction product of the base material layer and the coating material layer. The intermediate material layer 16 may itself include more than one layer of material, may be a non-homogenous mixture of different materials, or may have a composition gradient through its thickness, to name a few examples. In another example, the intermediate layer includes a continuous or discontinuous oxide layer, such as an oxide of the base material layer 14 that can form with exposure of the base material layer to the environment (e.g., aluminum oxides, iron oxides, etc.). The sheet metal piece 12 may include other, additional material layers as well.

One specific example of a multi-layered sheet metal piece useful for forming body and structural components in the automotive and other industries, such as that shown in FIG. 3, is a coated steel product in which the base material layer 14 is made from steel in any of its various possible compositions. In one particular embodiment, the base material layer 14 is a high-strength or hardenable steel alloy such as a boron steel alloy, dual phase steel, press hardened steel (PHS) or a high-strength low-alloy (HLSA) steel. Such materials, while strong for their weight, often require heat treating processes to attain the high-strength properties and/or can only be formed at high temperatures. The coating material layer 18 may be selected to help prevent oxidation during heat treatment, to be lighter in weight than the base material layer 14, and/or to interdiffuse with the other layers of the sheet metal piece 12 during subsequent heat treatment. In one embodiment, the coating material layer 18 is an aluminum (Al) alloy, such as an Al-silicone (Al—Si) alloy. Other possible compositions for coating material layer 18 include pure aluminum or zinc and its alloys or compounds (e.g., where the underlying material is galvanized). Where the base material layer 14 is steel and the coating material layer 18 comprises aluminum, the intermediate material layer 16 may include iron and aluminum in the form of intermetallic compounds such as FeAl, $FeAl_2$, $Fe_3Al$, $Fe_2Al_5$ or various combinations thereof. The intermediate material layer 16 may also include an alloy of constituents from adjacent layers.

Exemplary material layer thicknesses range from about 0.5 mm to about 2.0 mm for the base material layer 14, from about 1 µm to about 15 µm for the intermediate layer 16, and from about 5 µm to about 100 µm for the coating material layer 18. Preferred material layer thicknesses range from about 0.5 mm to about 1.0 mm for the base material layer 14, from about 5 µm to about 10 µm for the intermediate layer 16, and from about 15 µm to about 50 µm for the coating material layer 18. In one embodiment, the combined thickness of the intermediate and coating material layers 16, 18 is in a range from about 15 µm to about 25 µm, and the intermediate material layer is about 20-30% of the combined thickness. For instance, the combined thickness of layers 16, 18 may be about 20 µm, where the intermediate material layer is about 4-6 µm thick, and the coating material layer makes up the remainder of the combined thickness. Of course, these ranges are non-limiting, as individual layer thicknesses depend on several factors specific to the application and/or the types of materials employed. For example, the base material layer 14 can be a material other than steel, such as alloys of aluminum, magnesium, titanium, or other suitable materials. The weld notches described herein may be used with more or less layers of material than shown in the figures. Skilled artisans will also appreciate that the figures are not necessarily to scale and that the relative thicknesses of layers 14-18 may differ from those illustrated in the drawings.

Referring again to FIG. 3, the weld notch 30 on the first side 24 of the sheet metal piece will be described. This description applies to the weld notch 30' on the opposite second side 26 as well, in this example. The weld notch 30 is a portion of the edge region 20 of the sheet metal piece 12 where some material has been removed or omitted from the otherwise uniform layered structure. The weld notch 30 promotes a high quality weld joint along edge 28 when the sheet metal piece is welded to another piece, and may do so via a configuration that reduces or eliminates the amount of the coating material layer 18 and/or the intermediate material layer 16 that becomes part of a subsequent weld joint. The weld notch is particularly useful where the coating material layer 18 includes one or more constituents that form discontinuities in or would otherwise weaken the resulting weld joint if included therein. The weld notch 30 has a characteristic notch width W and notch depth D, each being relatively constant along the length of edge 28 in this particular embodiment. The notch width W is the distance from edge 28 to the first notch surface 32, and the notch depth D is the distance from the outer surface of the coating material layer 18 to the second notch surface 34. Where the weld notch 30 is square with the sheet metal piece, as shown in this particular example, the notch width W is equal to the width of the second notch surface 34, and the notch depth D is equal to the width of the first notch surface 32.

The dimensions of the weld notch 30 may be related to the thickness T of the sheet metal piece, to the intended size of the weld joint to be formed at edge 28, and/or to one or more material layer thicknesses. In one embodiment, notch width W is in a range from about 0.5 to about 1.5 times the thickness T. In another embodiment, the notch width W is in a range from about 0.5 mm to about 4 mm. The notch width W may also be at least one half of the width of the intended weld joint. The notch depth D for the example shown in FIG. 3 is greater than the thickness of the coating material layer 18 and less than the combined thickness of the intermediate and coating material layers 16, 18. But this differs in some of the other exemplary embodiments.

The weld notch 30 can also be described with relation to certain characteristics of the notch surfaces 32, 34. For example, in the embodiment of FIG. 3, the first notch surface 32 includes material from both of the intermediate material layer 16 and the coating material layer 18. The second notch surface 34 includes material from the intermediate material layer 16 only, and the first and second notch surfaces intersect along an edge that is positioned or located in the intermediate material layer. Thus, in this particular example, the weld notch 30 is formed in the sheet metal piece 12 by removing the entire coating material layer 18 and a portion of the intermediate material layer 16 along edge region 20. Each of the notch surfaces 32, 34 may also include striations, witness lines, or other indicators of the type of process used to remove material at the weld notch location. Ablasion processes such as laser ablasion or mechanical ablasion can form notch surfaces with different surfaces characteristics and are subsequently described in further detail.

Figure 5:
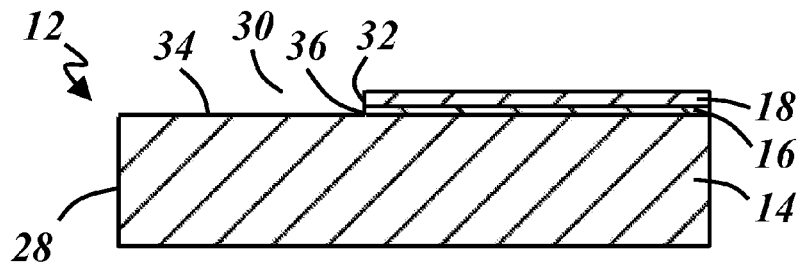
FIG. 5 is a cross-sectional view of an exemplary sheet metal piece including a weld notch, where the coating material layer and the intermediate material layer are removed.

FIG. 5 shows another example of a weld notch 30, where the first and second notch surfaces 32, 34 intersect along an edge that is located at the interface between the base material layer 14 and the intermediate material layer 16. The first notch surface 32 includes material from both of the intermediate material layer 16 and the coating material layer 18, and the second notch surface 34 includes material from the base material layer 14 only. In this example, the weld notch 30 is formed in the sheet metal piece 12 by removing the coating material layer 18 and the intermediate material layer 16 at edge region 20.

Figure 6:
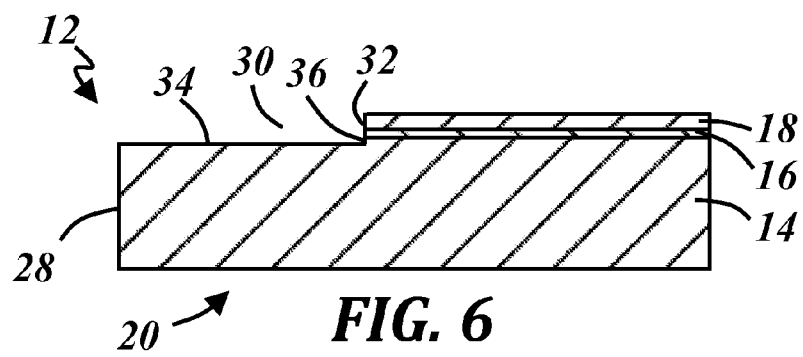
FIG. 6 is a cross-sectional view of another exemplary sheet metal piece including a weld notch, where the coating material layer, the intermediate material layer, and a portion of the base material layer are removed.

FIG. 6 illustrates a weld notch 30 with first and second notch surfaces 32, 34 that intersect each other along an edge that is located in the base material layer 14. The first notch surface 32 includes material from the base material layer 14, the intermediate material layer 16, and the coating material layer 18, while the second notch surface 34 includes material from the base material layer 14 only. In this example, the weld notch 30 is formed in the sheet metal piece 12 by removing the coating material layer 18, the intermediate material layer 16, and a portion of the thickness of the base material layer 14 at edge region 20.

Figure 7:
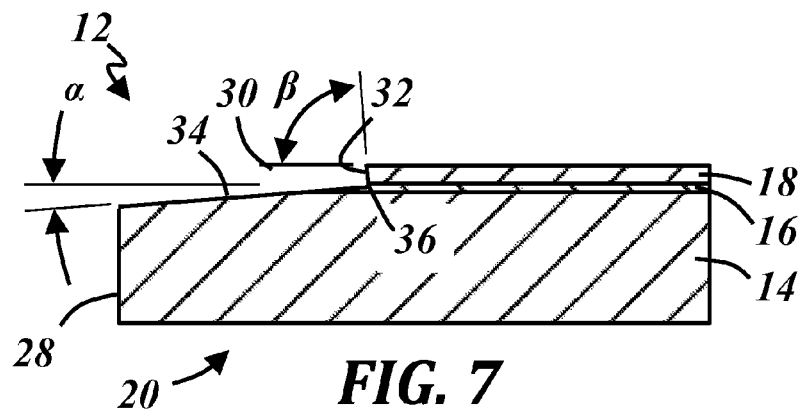
FIG. 7 is a cross-sectional view of another exemplary sheet metal piece including an off-axis weld notch.

FIG. 7 shows another embodiment of sheet metal piece 12, where the weld notch 30 is off-axis. In other words, at least one notch surface (in this case both notch surfaces 32, 34) is neither perpendicular nor parallel with the outermost surface of the coating material layer 18. The notch surfaces 32, 34 may be perpendicular with each other as shown and form respective angles α and β with the outermost surface of the coating material layer 18. Angle β is less than 90° in this example (90°−α), but could be greater than or equal to 90°. In the example of FIG. 7, the first notch surface 32 includes material from the intermediate material layer 16 and the coating material layer 18, while the second notch surface 34 includes material from the base material layer 14 and the intermediate material layer 16. The notch surfaces 32, 34 intersect each other along an edge 36 in the intermediate material layer 16. This weld notch 30 may be formed in the sheet metal piece 12 by removing the coating material layer 18, a portion of the thickness of the intermediate material layer 16, and a portion of the thickness of the base material layer 14 at edge region 20.

Figure 8:
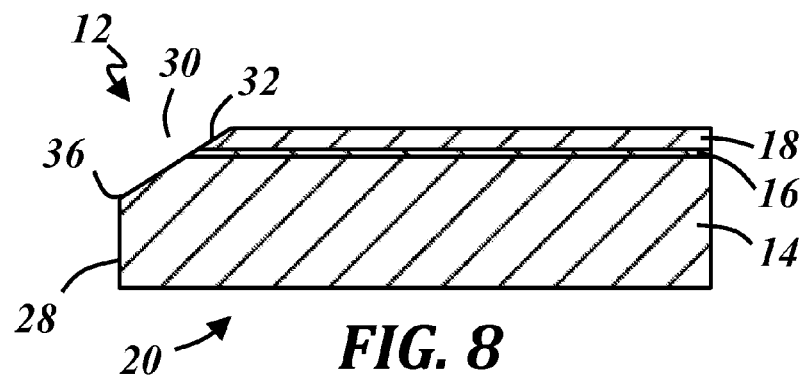
FIG. 8 is a cross-sectional view of another exemplary sheet metal piece including a different off-axis weld notch.

FIG. 8 shows a sheet metal piece according to another embodiment, where the weld notch 30 is in the form of a chamfer or angled surface and is defined by notch surface 32. Notch surface 32 is planar (i.e., generally planar, not necessarily perfectly planar) and includes material from all of the base, intermediate, and coating material layers 14-18, and intersects edge 28 of the sheet metal piece 12 along an edge located in the base material layer 14. In another embodiment, the chamfer-like weld notch 30 includes material from the intermediate material layer 16 and the coating material layer 18 only, but not from the base material layer 14, thus intersecting edge 28 in the intermediate layer 16 or at the interface between the base material layer 14 and the intermediate layer 16.

Figure 9:
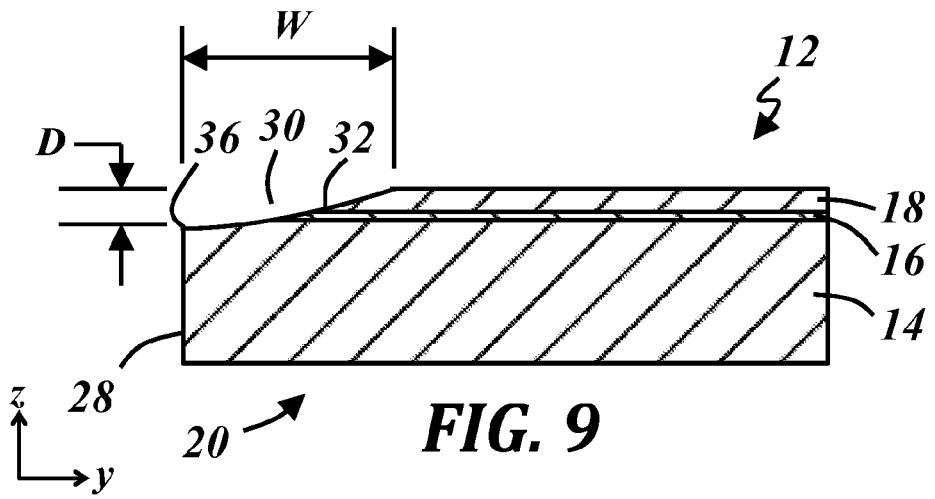
FIG. 9 is a cross-sectional view of another exemplary sheet metal piece including a weld notch with a non-uniform depth.

FIG. 9 shows a sheet metal piece according to another embodiment, where the weld notch 30 is defined by a curved or contoured notch surface 32. The notch surface 32 shown here includes material from all of the base, intermediate, and coating material layers 14-18, and intersects edge 28 of the sheet metal piece 12 along an edge located in the base material layer 14. The depth D of the weld notch 30 is variable and is illustrated as being measured at its maximum value in this particular example, which is at the edge 28 of the sheet metal piece 12. In another embodiment, the contoured weld notch 30 includes material from the intermediate material layer 16 and the coating material layer 18 only, but not from the base material layer 14, thus intersecting edge 28 in the intermediate layer 16 or at the interface between the base material layer 14 and the intermediate layer 16.

Figure 10:
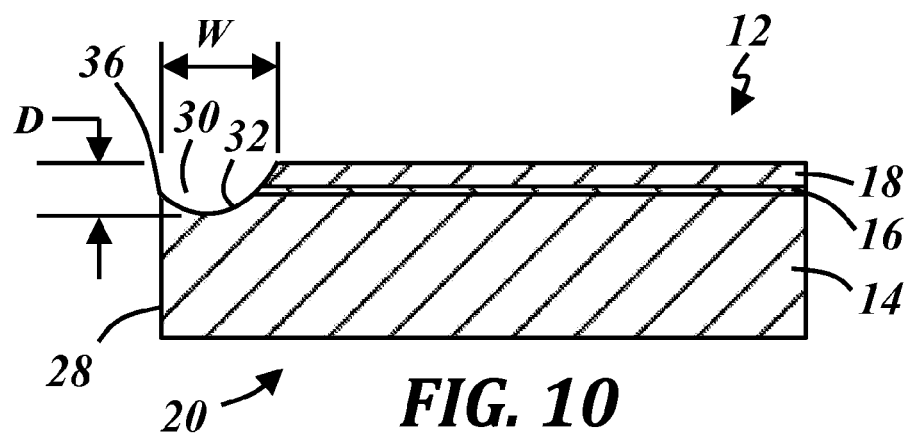
FIG. 10 is a cross-sectional view of another exemplary sheet metal piece including a different weld notch with a non-uniform depth.

FIG. 10 shows a sheet metal piece according to another embodiment, where the weld notch 30 is defined by a contoured notch surface 32 that is different from that of FIG. 9. The notch surface 32 shown here includes material from all of the base, intermediate, and coating material layers 14-18, and intersects edge 28 of the sheet metal piece 12 along an edge located in the base material layer 14. The depth D of the weld notch 30 is variable and is illustrated as being measured at its maximum value in this particular example, which is in the base material layer 14 and spaced away from the edge 28 of the sheet metal piece 12 in this particular example.

Figure 11:
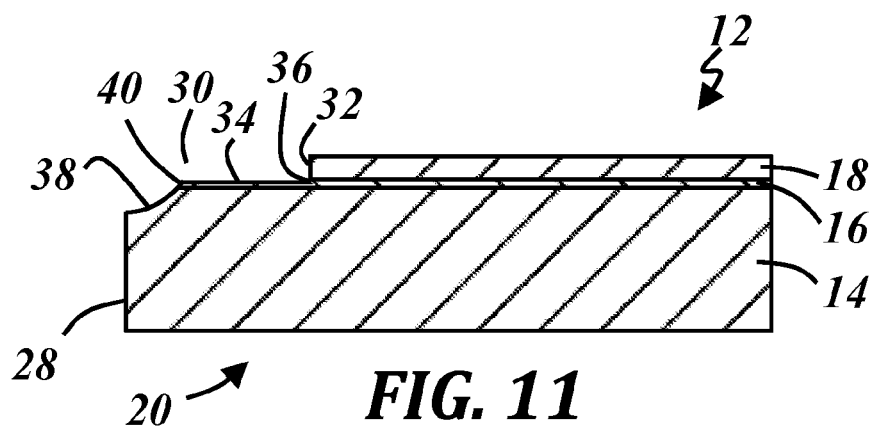
FIG. 11 is a cross-sectional view of another exemplary sheet metal piece including a weld notch with a non-uniform depth and multiple intersecting surfaces.

FIG. 11 shows another embodiment of sheet metal piece 12, where the weld notch 30 is defined by a first notch surface 32, a second notch surface 34, and a third notch surface 38. This embodiment has first and second notch surfaces 32, 34, as described above and shown in FIG. 3, that intersect along an edge located in the intermediate material layer 16. The third notch surface 38 is a contoured notch surface that intersects the second notch surface 34 along an edge 40 located in intermediate material layer 16 at one end, and the edge 28 of the sheet metal piece 12 at the other end. The third notch surface 38 includes material from the base material layer 14 and the intermediate material layer 16, in this example. The depth of the weld notch 30 along the second and/or third notch surfaces 34, 38 may vary from that shown in FIG. 11, as may the width of the second and/or third notch surfaces. Skilled artisans will appreciate the wide variety of combinations of notch surface shapes, widths, and depths that are possible.

FIGS. 7-11 collectively show various embodiments of sheet metal pieces with weld notches 30 that each has a non-uniform depth. In other words, in these examples, the depth of each weld notch 30 varies across the one or more weld notch surfaces depending on how far from the edge 28 of the sheet metal piece the depth is measured. In most of these embodiments, with the exception of that shown in FIG. 10, the average depth of the weld notch is greatest towards the edge of the sheet metal. These types of weld notches can be formed by ablasion processes in which an ablasion tool makes multiple passes along different portions of the edge region 20, or where the ablasion tool is configured to remove different amounts of material from the sheet metal piece as a function of distance from the edge 28.

Figure 12:
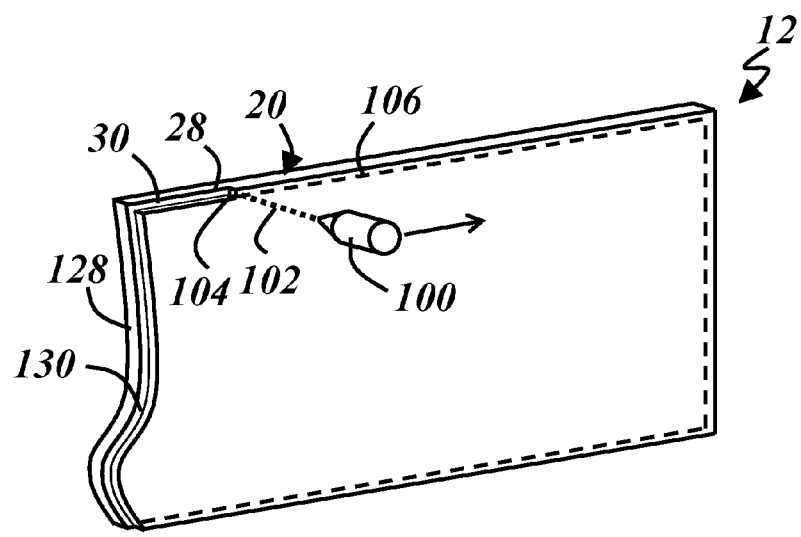
FIG. 12 is a perspective view of an exemplary laser ablation process for forming a weld notch.

Referring now to FIG. 12, there is shown an exemplary process for forming a weld notch in a sheet metal piece. The particular process shown schematically in the figure is a laser ablasion process in which a laser light source 100 emits a laser light beam 102 directed at the edge region 20 of the sheet metal piece 12. Energy provided by the laser light beam 102 is transferred to the piece 12 in the form of thermal energy at an ablasion site 104, melting and/or vaporizing material at a focal point to remove it from the sheet metal piece 12. The ablasion tool, whether a laser light beam or a mechanical tool such as a scraper or wire brush, follows a path 106 along the edge region 20 to form a weld notch 30 of the desired configuration. Some portions of the path 106 can be rectilinear as shown in the figure, and other portions can be contoured or curvilinear. For example, the weld notch 130 shown in FIG. 12 is contoured to follow the shape of edge 128. It is not necessary for the weld notch 30 to follow a straight path 106, as paths having other configurations can be followed instead. For sheet metal pieces that include base, intermediate, and coating material layers 14, 16, 18, such as that shown in FIG. 3, the weld notch 30 may be formed by removing all or some of the coating material layer 18, all or some of the intermediate material layer 16, and/or some of the base material layer 14 along the edge region 20.

In this and other embodiments where laser ablation is employed, the sheet metal piece 12 may be held stationary while the laser source 100 moves the laser beam 102 along the path 106, as indicated by the arrow in FIG. 12. In a different embodiment, the sheet metal piece 12 is moved or indexed while the laser source 100 remains stationary. Other techniques, such as moving both the laser source and the sheet metal piece, may be employed as well. Any suitable laser or other comparable light emitting device 100 may be used to form the weld notches, and may do so using a variety of operating or equipment parameters. In one example, the laser source 100 is a Q-switched laser, but other continuous wave and pulsed laser types may be used instead such as various nanosecond, femtosecond and picosecond pulsed lasers. The laser spot or footprint 104 can be round, square, rectangular, elliptical, or any other suitable shape, some examples of which are subsequently described. Non-limiting examples of selectable or adjustable operating parameters for the laser source 100 include: laser power, pulse frequency, pulse width, pulse energy, pulse power, duty cycle, spot area, the overlap between successive laser pulses, and the speed of laser source 100 relative to sheet metal piece 12, to cite a few possibilities. Any combination of these operating parameters may be selected and controlled by the present method based on the particular needs of the application. Various examples of laser ablation processes are described in further detail below.

Figure 13:
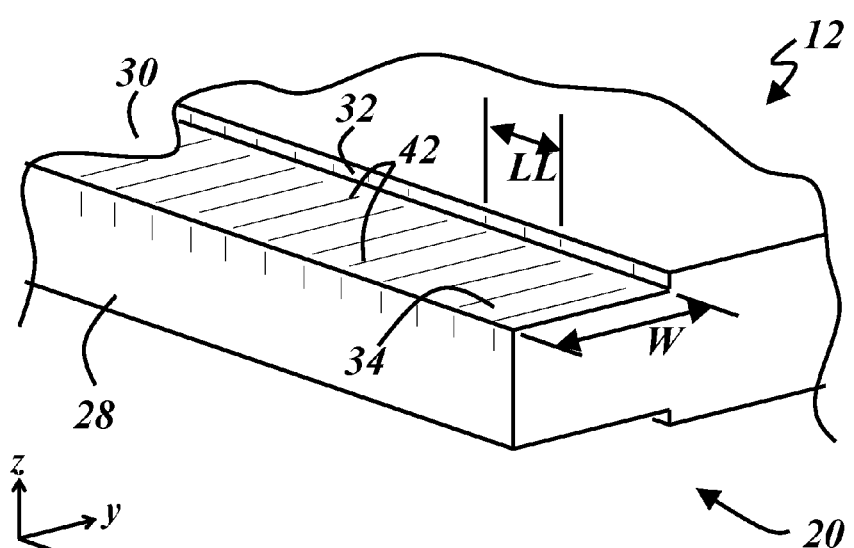
FIG. 13 is an enlarged perspective view of an exemplary sheet metal piece with a weld notch formed by laser ablasion.
Figure 14:
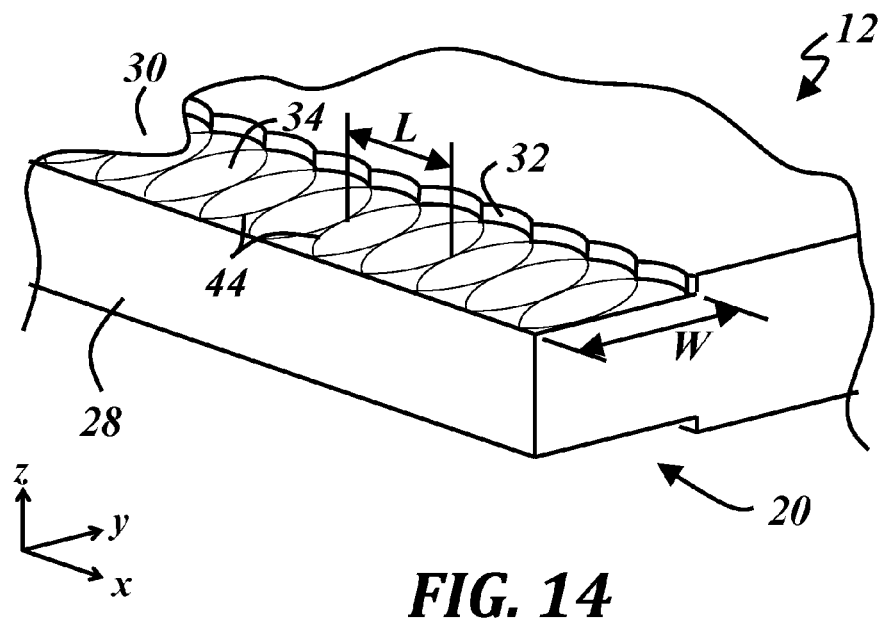
FIG. 14 is an enlarged perspective view of another exemplary sheet metal piece with a weld notch formed by laser ablasion by a different laser.
Figure 15:
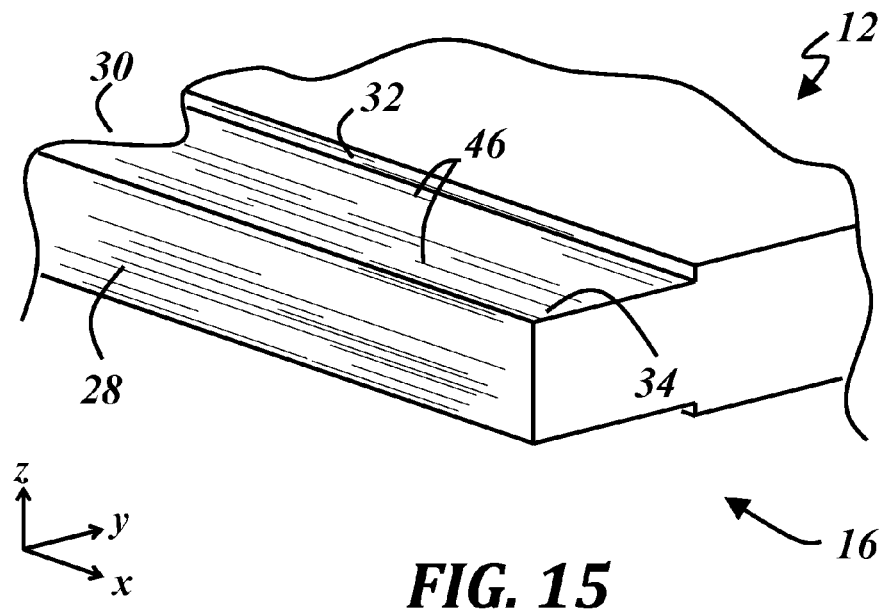
FIG. 15 is an enlarged perspective view of another exemplary sheet metal piece having a weld notch formed by a mechanical ablasion process.

FIGS. 13-15 show exemplary sheet metal pieces 12 with surfaces that include process markings or witness lines characteristic of the particular process used to form the weld notches 30. FIG. 13 is an example of one possible appearance of the weld notch surfaces 32, 34 and/or edge 28 when the weld notch 30 is formed by a laser ablasion process. The illustrated weld notch surfaces 32, 34 each include visible lines or markings 42. The markings 42 are generally parallel with the y-direction and evenly spaced from one another along the x-direction. Each individual marking indicates the location of a laser light beam edge during processing, where the laser light beam shape is square or rectangular and the laser light beam is provided as a pulsed beam rather than a continuous beam. For example, the laser light beam may have dimensions in the x- and y-directions of L and W, respectively, and be directed at the edge region at the ablasion site 104 to remove material with a certain number of laser pulses. The light source may then be indexed by ½ L to remove more material, so that markings 42 are apparent every ½ L along the x-direction as shown. The example of FIG. 13 includes similar ablasion markings along edge 28.

The laser light beam may be shaped otherwise (e.g., round, oval, etc.) and successive ablasion sites may have more or less overlap. For example, FIG. 14 shows circular markings 44, each with a length L equal to the diameter of a round laser light beam. In this example, successive markings 44 overlap by ½ of the beam diameter, and the first notch surface 32 has a scalloped shape.

FIG. 15 is an example of one possible appearance of weld notch surfaces 32, 34 and/or edge 28 when the weld notch 30 is formed by a mechanical ablasion process. The illustrated weld notch surfaces 32, 34 each include visible lines or markings 46. The markings 46 are generally parallel with the x-direction in this embodiment and are randomly spaced from one another in the y-direction. These markings may be produced by irregularities in a scraping tool or by individual wires of a wire brush abrading the surfaces. Oriented as shown, markings 46 may result from a scraping tool scraping in the x-direction or a wire brush rotating about an axis in the y-direction. Markings 46, however, may be in other orientations as well, such as in the y-direction, diagonally in the x-y plane, or randomly.

Figure 16:
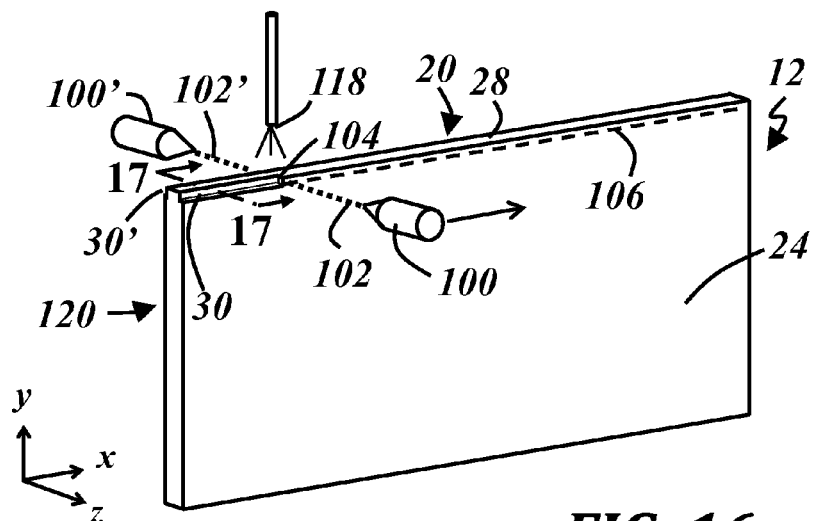
FIG. 16 is a perspective view of an exemplary dual-laser beam ablation process.

Referring now to FIG. 16, there is shown another exemplary method for forming a weld notch 30 in a sheet metal piece 12 using a laser ablation process. In this method, first and second laser beams 102, 102' are directed at the edge region 20 from first and second laser sources 100, 100' located on opposite sides 24, 26 of the sheet metal piece in order to form the weld notches 30, 30'. This type of multi-laser arrangement allows the present method to simultaneously remove material from one or more material layers on opposite sides of the edge region 20, which can shorten the process time compared to the use of a single laser source. In addition, a multi-laser arrangement may offer improved selection and/or control of operating parameters for each side of the sheet metal piece 12, as two different types of laser sources or the same type of laser source programmed with different operating parameters can be custom tailored to each side. This may be useful, for example, where the material layers on one side of the sheet metal piece 12 have a different composition or thickness than those on the other side of the sheet metal. Although shown directly facing each another in FIG. 16, the laser sources 100, 100' may be offset or angled away from each another to avoid one laser source inadvertently striking or damaging the other laser source. In another example, the laser sources 100, 100' are located on the same or opposite sides of the sheet metal piece 12, but are spaced from one another so that they direct their respective laser beams towards different edge regions of the same sheet metal piece 12. For instance, one laser beam can be directed at the top edge region 20, while the other laser beam is directed to the side edge region 120.

Figure 17:
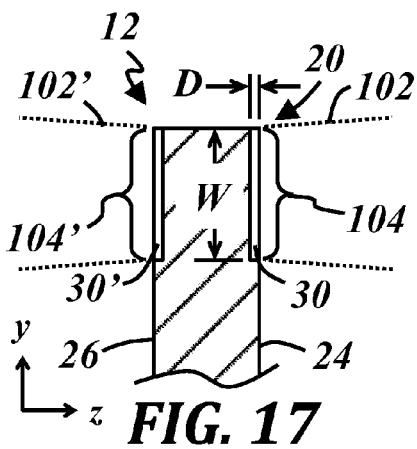
FIG. 17 is a cross-sectional view of the laser ablation process of FIG. 16.
Figure 18:
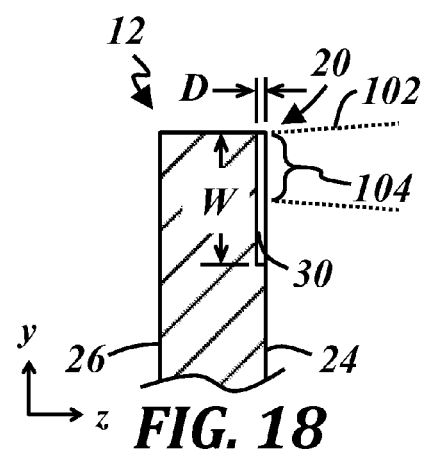
FIG. 18 is a cross-sectional view of another exemplary laser ablation process, where the laser spot is narrower than the width of the desired weld notch.

FIG. 17 is a cross-sectional view of a portion of the multi-laser arrangement of FIG. 16, where the two laser beams 102, 102' are directed at the edge region 20 from opposite sides of the sheet metal piece 12 to form weld notches 30, 30' with a depth D and width W. Although shown here with the same size laser beams, spots, and weld notches on opposite sides of the sheet metal piece 12 generally opposing one another through the thickness of the sheet metal piece, their respective sizes, shapes, etc. can be independent. For example, it is possible for laser beam 102 to produce a weld notch 30 that is different in terms of size, shape, depth, pattern, etc. than the weld notch 30' that is formed by laser beam 102'. The opposing ablation sites on opposite sides of sheet metal piece 12 may be mirror images of one another or they can vary depending on the particular needs of the application. In the particular example shown in FIG. 17, laser beam 102 generates a laser spot or footprint 104 that has the same width W as the desired weld notch 30. Thus, the method is able to create weld notch 30 with a single pass of laser beam 102 along the length of edge region 20. This is different than the example shown in FIG. 18, where laser beam 102 generates a laser spot 104 that has a smaller or narrower width than the desired weld notch width W. In this case, the laser beam 102 must make multiple passes in order to accommodate the wider width W of the weld notch, and may do so according to several different techniques.

Figure 19:
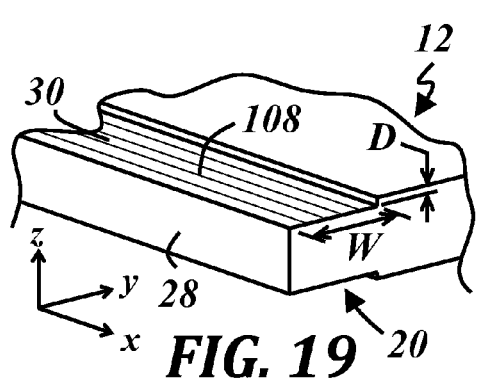
FIG. 19 is an enlarged perspective view of a weld notch that may be formed by the laser ablation process of FIG. 18.
Figure 20:
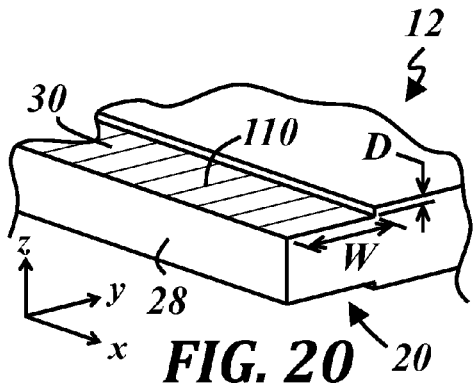
FIG. 20 is an enlarged perspective view of a weld notch that may also be formed by the laser ablation process of FIG. 18.

According to one potential technique, the laser beam 102 makes multiple passes along the full length of the edge region 20 (multiple passes in the x-axis direction), where each pass is indexed to a new y-axis position in order to accommodate the narrow laser spot 104. Such a technique may result in a weld notch with an ablation pattern 108, as illustrated in FIG. 19. This technique may also be useful where it is desired to form a weld notch with a non-constant or non-uniform depth, as described in some of the examples above. For instance, the laser beam 102 may remove more material from the edge region 20 (i.e., create a greater depth D) during a first pass that tracks along the edge 28 of the sheet metal piece than during a second pass that is located more inboard and further away from the edge 28. The operating parameters of the laser source 102 could be controlled or manipulated in order to accomplish this. A different technique involves the laser beam 102 moving along the width of the edge region 20 (in the y-axis direction) before advancing to the next position along the length of the edge region (the x-axis direction). This type of back-and-forth technique can create a weld notch with an ablation pattern 110 like the own shown in FIG. 20 and results in only a single pass along the length of the edge region 20 (x-axis direction).

Turning now to FIGS. 21-23, there is shown an exemplary laser ablation process where laser beam 102 is directed at the edge region 20 according to a non-zero angle of incidence α. The angle of incidence α, as used herein, refers to the angle that is formed between a central axis A of the laser beam and a line B that is normal to the major surfaces of the sheet metal piece. The angle of incidence α can be positive or negative. In the embodiments of FIGS. 12 and 16, the angle of incidence α is zero, and in the exemplary embodiment shown in FIGS.

21 and 22, the angle of incidence α is between approximately 15° and 75° (e.g., about 25°). Other angles are certainly possible, depending on the particular application. A non-zero angle of incidence α can be used to form a weld notch 30 that is offset with respect to the different material layers of the sheet metal piece 12, such as that shown in FIG. 22 where the weld notch is crooked or tilted. Other examples of off-axis weld notches that can be formed using a laser beam at a non-zero angle of incidence are shown in FIGS. 7 and 8. A non-zero angle of incidence α can also be used to simultaneously remove material from more than one surface of the sheet metal piece 12 with a single laser, such as from the edge surface 28 and from the side or major surface 24 at the same time. In other words, the laser beam 102 is directed at the edge region 20 according to an angle of incidence α such that it simultaneously impinges more than one surface of the sheet metal piece 12.

Multi-surface laser impingement may be particularly useful when used with coated sheet metal pieces that have been cut or sheared after the coating process, such as when coated sheet metal rolls are cut into individual blanks or slit-to-width. With reference to the enlarged view of FIG. 23, the intermediate and/or coating material layers 16, 18 may become smeared or pulled onto edge 28 when the sheet metal is cut into individual blanks such that material from layers 16, 18 at least partly wraps around the corner or edge 112. This can be particularly true if the cutting or shearing equipment is dull or otherwise worn. In FIG. 23, the outlined arrow indicates the direction of shear. Removing the smeared material layers from both the edge surface 28 and the side surface 24 may further improve a subsequent weld joint at edge region 20, as both surfaces could potentially contaminate a nearby weld. A single laser aligned according to a non-zero angle of incidence α, as described above, or multiple lasers directed to the same edge region, as described below, could be used to remove material from intermediate and/or coating material layers 16, 18 that has become smeared or otherwise pulled down the edge surface 28. It is possible for the method to use the lengthwise edge or corner 112 of the sheet metal piece 12 as a guide feature by aligning the laser beam 102 such that its center axis A strikes the sheet metal piece at or within a certain distance from the lengthwise edge 112 (e.g., within one-half of the laser spot width). Other alignment and guide techniques may be used as well.

Figure 24:
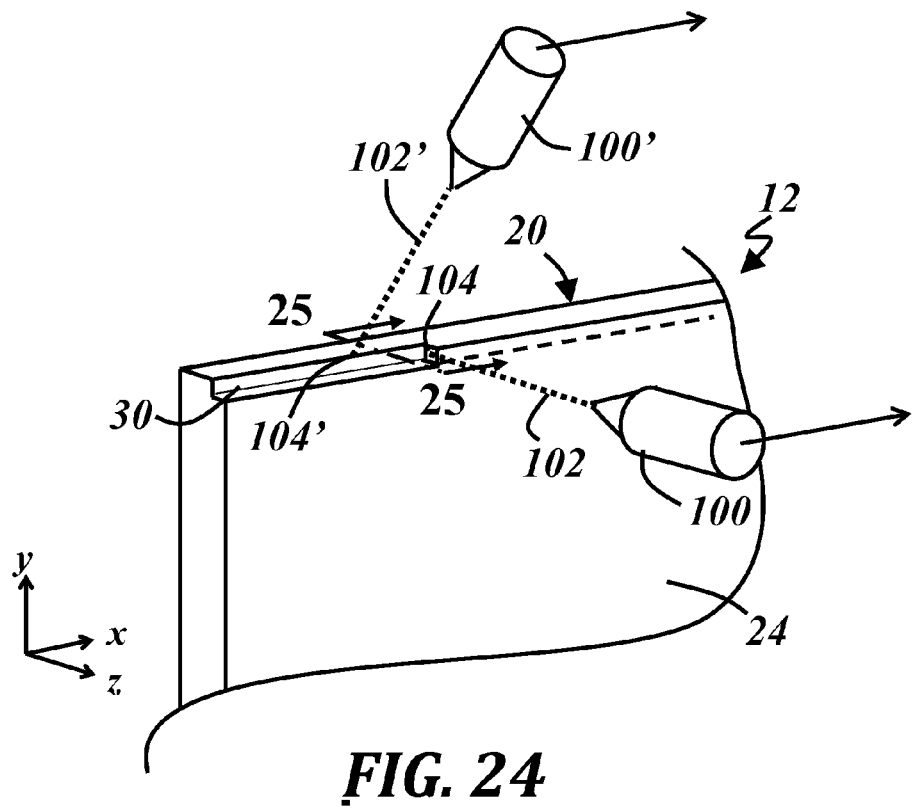
FIG. 24 is a perspective view of another exemplary laser ablation process being performed on a sheet metal piece, where the process uses multiple lasers to form a weld notch.
Figure 25:
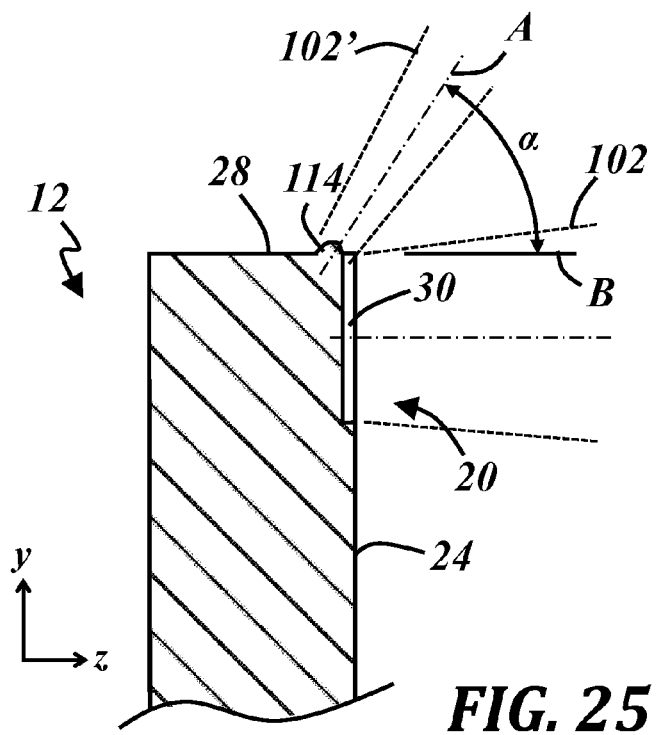
FIG. 25 is a cross-sectional view of the laser ablation process from FIG. 24, where the process forms a weld notch with multiple non-overlapping lasers.

FIGS. 24 and 25 illustrate another exemplary laser ablation process. In this embodiment, the first and second laser beams 102, 102' are directed at the edge region 20 according to different angles of incidence. Laser beam 102 is shown here impinging the edge region 20 at an angle of incidence that is approximately zero (normal to the side surface), while laser beam 102' impinges the edge region according to a non-zero angle of incidence α between approximately 15°-75° (e.g., about 45°). It is possible for the laser beams 102, 102' to be aimed or directed to the same laser spot or ablation site, or they could be directed at separate ablation sites 104, 104' that are spaced from one another along the x-axis, as shown. One potential reason for spacing the laser beams is to allow material that is splattered or expulsed by the first laser beam 102 to have time to at least partly solidify or react before being impinged and vaporized by the second laser beam 102'. In the embodiment shown in FIGS. 24 and 25, the first laser beam 102 moves along the edge region 20 (x-axis direction) and removes material primarily from the side surface 24 of the sheet metal piece, while the second laser beam 102' follows behind and removes material from the edge surface 28. The resulting formation—i.e., the notched out areas formed by both lasers 102, 102'—constitutes the weld notch 30 and improves the weldability of the sheet metal piece 12 by removing material from one or more material layers at the future site of a potential weld joint.

The enlarged cross-sectional view of FIG. 25 shows the edge region 20 after the first laser beam 102 has removed material from side surface 24, but before the second laser beam 102' has removed material from the edge surface 28. At this stage, molten material struck by the first laser beam 102 can flow or splatter away from the weld notch 30 due to the rapid thermal expansion at the ablasion site. This molten material can be deposited nearby and form a resolidified or partially resolidified protrusion 114. If the protrusion 114 includes material from the material layers 16, 18, then any subsequently formed weld joint along edge region 20 could become contaminated or compromised. The second laser beam 102' may be directed with any suitable angle of incidence α, zero or non-zero, at the protrusion 114 in order to remove it from the edge region 20. In another embodiment, the second laser beam 102' is replaced with a mechanical ablasion tool such as a scraper or wire brush for removal of the protrusion or other material along the edge surface 28. The mechanical ablation tool may follow behind the first laser beam 102 in the same set-up as shown, or it could be used in an entirely separate operation. A non-limiting example of a suitable mechanical ablation tool is the scraper tool disclosed in U.S. Pat. No. 7,971,303 to Prasad et al., the entire contents of which are hereby incorporated by reference.

Turning now to FIGS. 26-28, there is shown another example of a multi-laser or dual-beam ablation process, where first and second laser beams 102, 102' overlap at a composite laser spot 116 where the combined energy of the lasers is greatest. In the illustrated example, the composite laser spot 116 is directed to the edge region 20 of the sheet metal piece 12 so that the composite laser spot at least partially covers the lengthwise edge or corner 112 and so that the most material removal occurs in this general area. This is demonstrated by the shape of the weld notch 30, which has a non-uniform depth that is greater in the area near edge 28, similar in configuration with the weld notch illustrated earlier in FIG. 11.

Overlapping laser spots 104, 104' may be used to tailor or manipulate the laser energy distribution at the ablation site, as shown in FIGS. 27 and 28. For example, the round laser spots 104, 104' shown at the top of FIG. 27 overlap to form the composite laser spot 116, and an exemplary corresponding energy distribution 200 across the overlapping laser spots 104, 104" is shown in the chart at the bottom of FIG. 27. The energy distribution 200 includes a peak or maxima 202 in the region of the composite laser spot 116 where both laser beams are present. The actual shape of the energy distribution may vary from that shown here depending on several factors, including the individual energy distributions of each laser spot, the distance of the focal plane from each laser spot, and other factors. Laser beams 102, 102' may emanate from laser sources that are co-located with each another and may extend toward the ablation site in a generally parallel manner (i.e., the two laser beams may have angles of incidence α that are within 10° of each another). This is somewhat different than the embodiment illustrated in FIG. 24, where the laser beams originate from laser sources that are spaced in the x-axis direction (not co-located) and that extend towards the ablation site in a generally non-parallel manner. As mentioned previously, it is possible for the method to utilize the lengthwise edge 112 of the sheet metal piece as a guide feature when the laser beams are moving along the length of the edge region 20 (in the x-axis direction).

This type of multi-laser or dual-beam process may be useful where it is desirable to form a weld notch 30 with a non-constant or non-uniform depth D across its width W, such as the weld notch illustrated in FIGS. 9-11 and 26. For instance, this process may remove material from the coating material layer 18, the intermediate material layer 16, and the base material layer 14 at the composite laser spot 116, while only removing material from the coating material layer 18 and/or the intermediate material layer 16 at the non-overlapping portions of the laser spots 104, 104'. Overlapping laser spots may be used in conjunction with other previously described embodiments as well. For instance, the second laser beam 102' may be directed at the sheet metal piece 12 according to a non-zero angle of incidence. FIG. 28 depicts a composite laser spot 116 where the individual laser spots 104, 104' are rectangular in shape, as opposed to the previous example where they are circular. Laser spots or footprints having different sizes, shapes, configurations, etc. may be used in lieu of or in addition to those described herein.

FIG. 29 illustrates another embodiment of a laser ablation process, where the sheet metal piece 12 is provided from a roll or coil and is fed in a machine direction (indicated by the unnumbered outline arrow) past a plurality of laser sources 100, 100'. Each of the laser sources 100, 100' emits a laser beam toward a different location on the edge region 20, and may do so from a different side and/or at a different angle of incidence α than the other lasers. In this particular example, the first two laser beams encountered by the sheet metal piece as it moves in the machine direction may remove material primarily from the two side surfaces 24, 26 of the sheet metal piece, while the next two angled laser beams may remove resolidified protrusions (e.g., portion 114 of FIG. 25) or other material formations from the edge 28. The resulting ablations at the edge region 20 together constitute the weld notches 30, 30'. The illustrated process may be useful for feeding the sheet metal 12, complete with weld notches 30, 30', directly to downstream processes where it may be cut, sheared, and/or joined with other sheet metal pieces along edge region 20.

One potential feature that may be used with any of the previously described embodiments involves monitoring process conditions and changing operating parameters in response thereto. The present method may employ a closed-loop feedback feature that automatically adjusts certain operating parameters in order to account for variations or changes in monitored process conditions, or it may utilize an iterative process in which certain operating parameters are incrementally or otherwise changed, to cite two possibilities. For example, a laser ablation process may be configured to monitor a characteristic of the sheet metal piece 12, such as the absorptivity or reflectivity of the material at the ablation site or laser spot 104. When the absorptivity or reflectivity changes or deviates by a given amount—for example, when the laser beam encounters a new material layer—the method may adjust an operating parameter of the laser, such as the pulse frequency and/or pulse width. This dynamic approach can be useful where the various material layers of the sheet metal piece 12 each have different optimum operating parameters that can be tailored by the present method. For example, a certain pulse frequency and/or pulse width may be more effective for removing the coating material layer 18 than it is for removing the intermediate material layer 16 or the base material layer 14. By monitoring process conditions and changing operating parameters accordingly, the present method may be able to detect when laser beam 102 reaches a new material layer and to implement optimal operating parameters for that layer in response thereto.

Another potential technique that may be used with any of the previously described embodiments involves arranging the sheet metal piece in a generally vertical orientation during the laser ablation process, as illustrated in FIGS. 12, 16, 21 and 24. Because of the vertical orientation, gravity can cause any molten material near the ablation site to flow in a desired direction. For example, if it is desirable to have molten material flow away from the edge 28 of the sheet metal piece, which is where a subsequently formed weld joint is likely to be located, then a vertical orientation similar to that the referenced figures can be used. This reduces the probability of molten coating material flowing toward the edge 28 and solidifying there, where it could be problematic in subsequent weld processes along that edge. The sheet metal piece need not be perfectly vertical, however. In some cases, it may be sufficient that the sheet metal piece is oriented so that the edge region 20 from which material is being removed is located higher than the remainder of the sheet metal piece. Where a weld notch is being formed on only one side of the sheet metal piece at a time, the sheet metal piece 12 may be oriented so that the side from which material is being removed is facing down during the laser ablasion process so that any excess molten material drips or flows away from the edge region 20.

Another technique useful to help prevent molten material from solidifying along the edge 28 of the sheet metal piece to be welded is to provide a high velocity jet 118 of air (see FIG. 16) or other fluid (e.g. nitrogen or an inert gas) at the location of the laser spot or ablation site 104 to blow molten material away from the edge. In FIG. 16, the jet 118 of air is located beyond the sheet metal piece surfaces so that the air flows in a direction towards the edge 28 (in the downward y-direction) to blow molten material towards the still-coated portion of the sheet metal piece. A jet 118 of air may alternatively or additionally be directed along the weld notch in the direction of laser movement (in the horizontal x-direction of FIG. 16). In one embodiment, a plurality of jets 118 are directed along the edge region to help prevent molten material from solidifying along the edge of the sheet metal piece. The individual jets can be directed all in the same direction or in different directions with respect to one another. Some of the preceding techniques may be used with sheet metal pieces arranged in horizontal orientations as well.

In another illustrative process that uses a laser beam to remove one or more layers of coating material from the sheet metal piece along an edge region of the sheet metal piece, the process also includes laser cutting of the sheet metal piece. Laser cutting employs a relatively high-powered laser, usually in a continuous mode rather than a pulsed energy mode, to separate a piece of sheet metal into two or more individual pieces. In a laser cutting process, the laser beam delivers sufficient energy to the sheet metal piece at the desired location of separation to melt and/or vaporize the base material layer. A high-velocity jet of air or other fluid can follow the laser beam to blow the molten material away from the sheet metal piece and effectively separate it into two individual sheet metal pieces with newly formed edges and edge regions. This process has been found to result in an edge (element 28 in the figures) and/or lengthwise corner (e.g., located at reference numeral 112 in FIGS. 22 and 23) that is substantially free of any material from the coating material layer and/or the intermediate material layer. Weld joints subsequently formed along edges produced in a laser cutting process sometimes exhibit noticeably improved strength over weld joints formed along mechanically sheared edges. Laser cutting may thus be considered one form of a laser ablation process useful for preventing unwanted constituents from inclusion in nearby and subsequently formed weld joints, and is a process that simultaneously cuts the sheet metal into individual blanks or other pieces while removing one or more layers of coating material.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A sheet metal piece for use in a welding process, comprising:
    a base material layer having a thickness in a range of about 0.5 mm to about 2.0 mm;
    a coating material layer having a thickness in a range of about 5 µm to about 100 µm;
    an intermediate material layer having a thickness in a range of about 1 µm to about 15 µm and being located between the base material layer and the coating material layer and including an intermetallic compound having at least one constituent from each of the base material layer and the coating material layer; and
    an edge region being located along an edge of the sheet metal piece that is to be welded and including a weld notch defined at least partially by a weld notch surface, the weld notch has a depth (D) that varies across a width (W) so that an average depth of the weld notch is greatest towards the edge of the sheet metal piece, wherein at the edge of the sheet metal piece material from both the coating material layer and the intermediate material layer is completely removed but a substantial portion of the base material layer remains at the edge of the sheet metal piece.

2. The sheet metal piece of claim 1, wherein the weld notch is defined by first and second notch surfaces that intersect one another, the first notch surface includes material from both the coating material layer and the intermediate material layer and the second notch surface includes material from at least one of the intermediate material layer or the base material layer, and the first and second notch surfaces intersect one another along an edge located in at least one of the intermediate material layer or the base material layer.

3. The sheet metal piece of claim 2, wherein the weld notch is further defined by a third weld notch surface that intersects both the second weld notch surface and the edge of the sheet metal piece, and the third weld notch surface is arranged within the weld notch so that material from at least one of the coating material layer or the intermediate material layer that has smeared down the edge of the sheet metal piece is removed.

4. The sheet metal piece of claim 1, wherein the weld notch surface includes material from both the coating material layer and the intermediate material layer and intersects the edge of the sheet metal piece.

5. The sheet metal piece of claim 4, wherein the weld notch is defined at least partially by a contoured weld notch surface that is curved, and the contoured weld notch surface includes material from both the coating material layer and the intermediate material layer and intersects the edge of the sheet metal piece.

6. The sheet metal piece of claim 4, wherein the weld notch is defined at least partially by a chamfered weld notch surface that is planar, and the chamfered weld notch surface includes material from both the coating material layer and the intermediate material layer and intersects the edge of the sheet metal piece.

7. The sheet metal piece of claim 1, wherein the weld notch is located along one side of the sheet metal piece, and the edge region further comprises an additional weld notch located along an opposite side of the sheet metal piece so that the two weld notches generally oppose one another through the thickness of the sheet metal piece.

8. A sheet metal piece for use in a welding process, comprising:
    a base material layer having a thickness in a range of about 0.5 mm to about 2.0 mm;
    a coating material layer selected from the group of aluminum, aluminum alloy, zinc or zinc alloy;
    an intermediate material layer being located between the base material layer and the coating material layer and including an intermetallic compound having at least one constituent from each of the base material layer and the coating material layer; and
    an edge region being located along an edge of the sheet metal piece that is to be welded and including a weld notch defined at least partially by a weld notch surface, the weld notch has a depth (D) that varies across a width (W) so that an average depth of the weld notch is greatest towards the edge of the sheet metal piece, wherein at the edge of the sheet metal piece material from both the coating material layer and the intermediate material layer is completely removed but a substantial portion of the base material layer remains at the edge of the sheet metal piece.

9. A sheet metal piece for use in a welding process, comprising:
    a base material layer;
    a coating material layer;
    an intermediate material layer being located between the base material layer and the coating material layer and including an intermetallic compound having at least one constituent from each of the base material layer and the coating material layer; and
    an edge region being located along an edge of the sheet metal piece that is to be welded and including a weld notch defined at least partially by first, second and third weld notch surfaces, wherein, in cross-section, the first weld notch surface extends from a side of the sheet metal piece and includes material from both the coating material layer and the intermediate material layer, the second weld notch surface extends from the first weld notch surface and includes material from at least one of the intermediate material layer or the base material layer, and the third weld notch surface extends from the second weld notch surface and includes material from the base material layer.

* * * * *